United States Patent [19]

Kwon

[11] Patent Number: 5,408,251

[45] Date of Patent: Apr. 18, 1995

[54] MEMORY SYSTEM FOR STORING TWO-DIMENSIONAL DIGITIZED IMAGE SIGNALS

[75] Inventor: Oh-Sang Kwon, Seoul, Rep. of Korea

[73] Assignee: Daewoo Electronics Co., Ltd., Seoul, Rep. of Korea

[21] Appl. No.: 146,425

[22] Filed: Oct. 29, 1993

[30] Foreign Application Priority Data

Oct. 29, 1992 [KR] Rep. of Korea .................. 92-20081

[51] Int. Cl.$^6$ ........................................... G09G 1/02
[52] U.S. Cl. ................................. 345/190; 345/203
[58] Field of Search ............... 345/190, 189, 185, 200, 345/201, 203, 28, 27

[56] References Cited

U.S. PATENT DOCUMENTS

| | | |
|---|---|---|
| 3,974,493 | 8/1976 | de Cavaignac et al. |
| 4,249,172 | 2/1981 | Watkins et al. ................... 345/28 |
| 4,404,554 | 9/1983 | Tweedy, Jr. et al. ............. 345/27 |
| 4,617,564 | 10/1986 | Yoshioka ......................... 345/200 |
| 4,618,858 | 10/1986 | Belch ............................... 345/28 |
| 4,790,025 | 12/1988 | Inoue et al. ...................... 345/201 |
| 5,095,422 | 3/1992 | Horiguchi ......................... 345/200 |

Primary Examiner—Ulysses Weldon
Assistant Examiner—Regina Liang
Attorney, Agent, or Firm—William F. Pinsak

[57] ABSTRACT

Disclosed herein is a memory system for storing a two dimensional digitized image signal consisting of a plurality of pixels arranged in $(2^M+X)$ columns and $(2^N+Y)$ rows, wherein X and Y do not exceed $2^{M-2}$ and $2^{N-1}$ respectively, and M and N are integers, comprising: a virtual address generator for generating $(M+N+2)$ bits of a virtual address having $(M+1)$ bits of a horizontal address component representing said $(2^M+X)$ columns and $(N+1)$ bits of a vertical address component representing said $(2^N+Y)$ rows; a memory, having storage locations of $2^{M+N+1}$, for storing the two dimensional digitized image signal, each of the storage locations capable of storing one pixel data therein and addressable by $(M+N+1$ bits) of a physical address; and address mapping circuitry for changing the virtual address to the physical address.

3 Claims, 4 Drawing Sheets

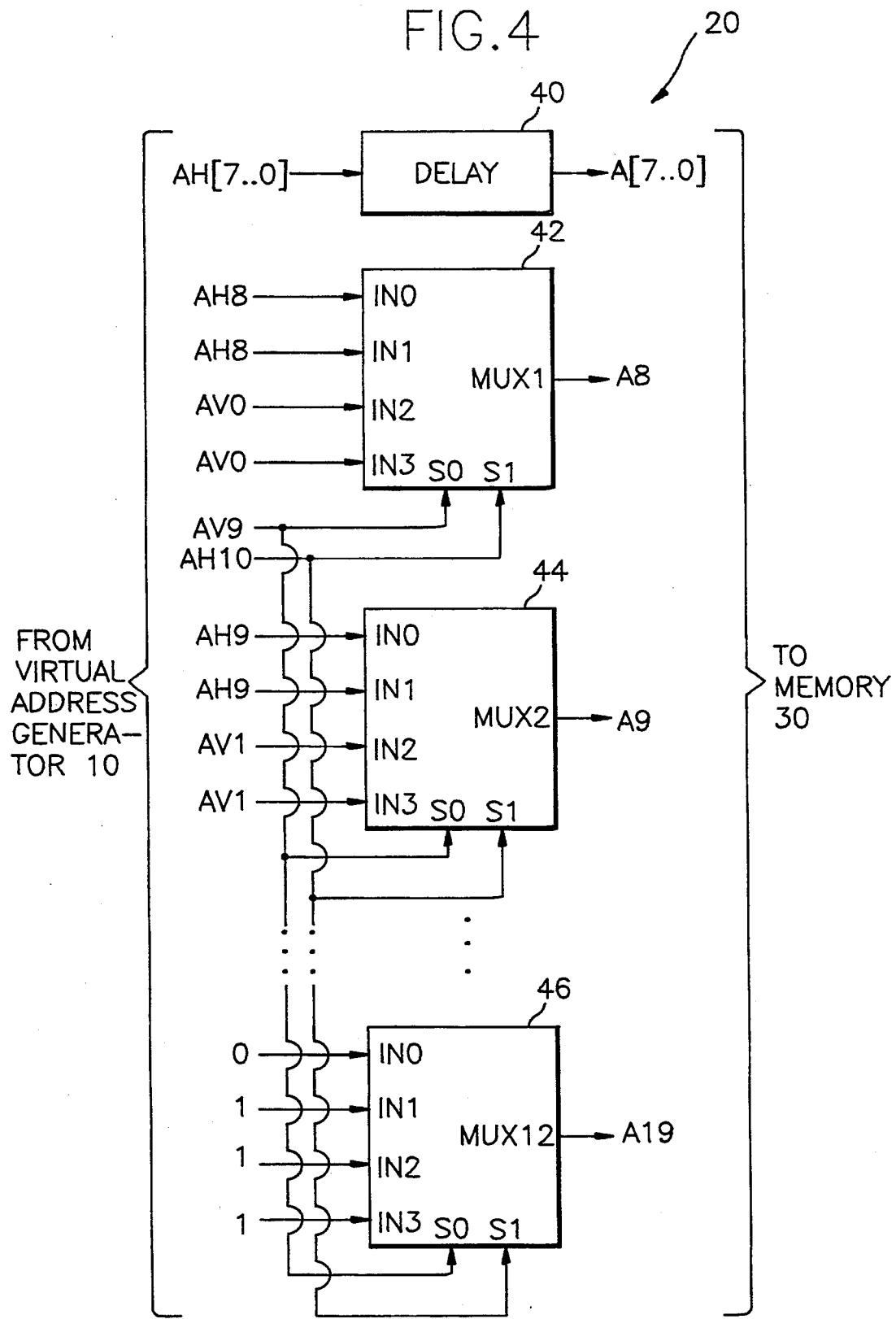

MEMORY SYSTEM FOR STORING TWO-DIMENSIONAL DIGITIZED IMAGE SIGNALS

FIELD OF THE INVENTION

The present invention relates to a memory system for storing two-dimensional digitized image signals; and, more particularly, to an improved memory system capable of optimizing the size of a memory for storing the two-dimensional image signals through the use of an address mapping technique.

DESCRIPTION OF THE PRIOR ART

Two-dimensional(2D) digitized image signals comprise a sequence of digital image "frames" wherein each frame is defined by columns and rows of pixels.

Generally, in an image signal processing system, 2D digitized image signals are processed on a frame-by-frame basis. Accordingly, a frame memory system is necessarily required to process and such 2D image signals.

A conventional memory system for processing 2D digitized image signals has a frame memory of a certain size and also has an address generator. The frame memory has a number of storage locations wherein the luminance levels of pixels are stored. The address generator produces an address which is comprised of a number of bits to be used as means of identifying a storage location in the frame memory.

Since the location of each pixel stored in a frame memory is represented by its column and row numbers, the address bits have a horizontal address component X representing the column position and a vertical address component Y denoting the position of the row. If the horizontal address component is comprised of M bits or elements and the vertical address component consists of N bits or elements, the total memory addressable by said (M+N) bits will have $2^M \times 2^N$ storage locations.

Since the size of a memory is fixed according to an industry standard (that is, the number of storage locations is fixed at, e.g., $2^{M+N}$), it does not always fit the actual size of a signal frame so that there sometimes exists a lack of full memory utilization in a conventional memory system. For example, if a frame signal having 1280 columns×720 rows of pixels is to be stored in a frame memory, the frame memory should be addressed with a 11 bit horizontal and a 10 bit vertical address components, i.e., a memory size of $2^{11} \times 2^{10}$ (=$2^{21}$), which is much greater than the actual required memory size of 1280×720.

SUMMARY OF THE INVENTION

It is, therefore, a primary object of the present invention to provide an improved memory system which is capable of optimizing the size of a memory for storing 2D image signals through the use of an address mapping technique.

In accordance with one aspect of the invention, there is provided a memory system for storing 2D digitized image signals consisting of a plurality of pixels arranged in ($2^M$+X) columns and ($2^N$+Y) rows, wherein X,Y do not exceed $2^{M-2}$, $2^{N-1}$ respectively, comprising: means for generating (M+N+2) bits of a virtual address having (M+1) bits of a horizontal address representing said ($2^M$+X) columns and (N+1) bits of a vertical address representing said ($2^N$+Y) rows; memory means for storing the 2D digitized image signals, having storage locations of $2^{M+N+1}$, each of the storage locations capable of storing one pixel data therein and addressable by (M+N+1 bits) of a physical address; and mapping means for changing the virtual address to the physical address.

In accordance with the invention, said mapping means utilizes a most significant bit(MSB) among the horizontal address bits and that among the vertical address bits constituting a virtual address to compartmentalize the storage locations of said memory means into four regions so as to map the virtual address to the physical address on a region-by-region basis, wherein the four regions are comprised of a first region having one-half of the entire storage locations, a second region having half the storage capacity of the first region, a third region having half the storage capacity of the second region and a fourth region having half the storage capacity of the third region, and wherein the first region is addressed by the MSB of the physical address, the second region is addressed by the MSB and its one adjacent bit of the physical address, the third region is addressed by the MSB and its two adjacent bits of the physical address and the fourth region is addressed by the MSB and its three adjacent bits of the physical address.

BRIEF DESCRIPTION OF THE DRAWINGS

The foregoing and other objects, features and advantages of the present invention will become apparent from the following detailed description of preferred embodiments of the invention, reference being made to the accompanying drawings, in which like reference numerals indicate like parts:

FIG. 4 represents a detailed address mapping circuitry employed in the present memory system.

DETAILED DESCRIPTION OF THE PREFERRED EMBODIMENTS

Figure 1:
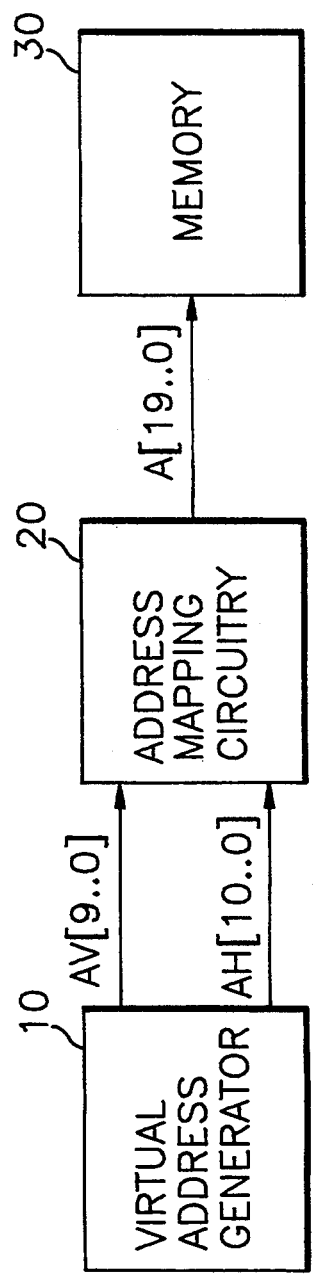
FIG. 1 schematically illustrates a memory system for storing two dimensional digitized image signals in accordance with a preferred embodiment of the present invention.

FIG. 1 illustrates a memory system for storing 2D image signals(or frame signals), for example, having their respective size of 1280 columns×720 rows, through the use of address mapping in accordance with a preferred embodiment of the present invention. As shown in FIG. 1, the memory system includes a virtual address generator 10, an address mapping circuitry 20, and a memory 30.

The virtual address generator 10 produces a "virtual" address having a horizontal address component AH and a vertical address component AV. The virtual address is generated so as to address a plurality of storage locations of a "virtual" or conventional frame memory, which storage locations are arranged corresponding to the locations of the pixels within a signal frame. Since, in the virtual address, the horizontal and the vertical address components are generated for the virtual frame memory having the storage locations arranged in 1280 columns and 720 rows, the horizontal address component is comprised of 11 bits and the vertical address component is comprised of 10 bits. As shown in FIG. 1, 11 bits of a horizontal address component AH[10 . . . 0] and 10 bits of a vertical address component AV[9 . . . 0] are provided to the address mapping circuitry 20.

The address mapping circuitry 20 utilizes an address mapping technique(as described below) in accordance with the invention to map a virtual address to a "physical(or real)" address in the memory 30. After the mapping procedure, the 20-bit physical address[19 . . . 0] from the address mapping circuitry 20 is directly provided to the memory 30.

The address mapping technique in accordance with the invention shall now be described. A 2D image signal of 1280 columns × 720 rows of pixels may be represented as $(2^M+X) \times (2^N+Y)$, wherein M and N represent respectively the number of bits contained in the horizontal and the vertical address components provided to a standard memory, which may be expanded as follows:

$$(2^M+X) \times (2^N+Y) = 2^{M+N} + 2^M Y + X 2^N + XY \quad (1)$$

Assuming that $X \leq 2^{M-2}$ and $Y \leq 2^{N-1}$, Eq(1) may be represented as:

$$(2^M+X) \times (2^N+Y) \leq 2^{M+N} + 2^{M+N-1} + 2^{N+N-2} + 2^{M+N-3} \quad (2)$$

From the above Eq(2), it can be seen that the first term requires $2^{M+N}$ storage locations, the second term requires $2^{M+N-1}$ storage locations being half the size of the first term, the third term requires $2^{M+N-2}$ storage locations being half the size of the second term, and the last term requires $2^{M+N-3}$ storage locations being half the size of the third term. Consequently, the number of all of the storage locations utilized through the address mapping process is reduced below $2^{M+N+1}$.

Figure 2A:
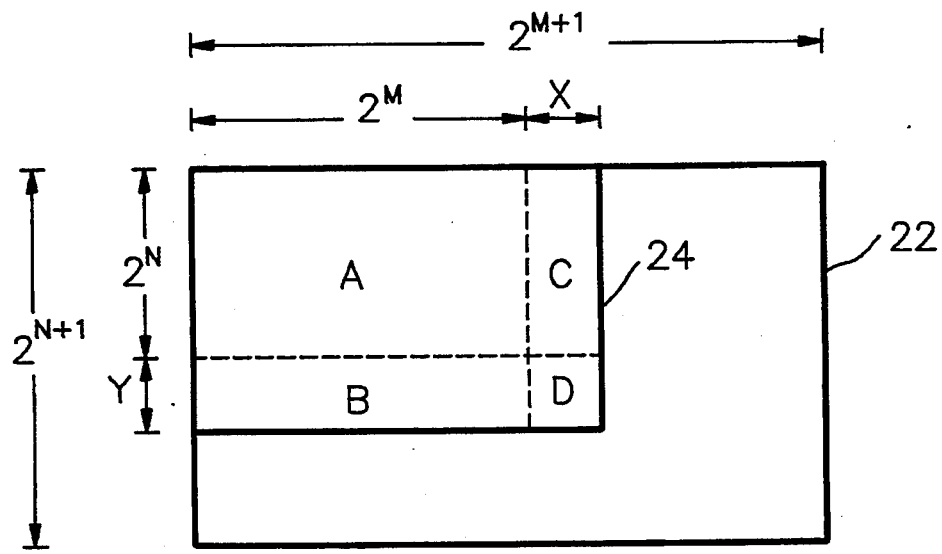
FIGS. 2A and 2B two-dimensionally describe an address mapping technique.
Figure 2B:
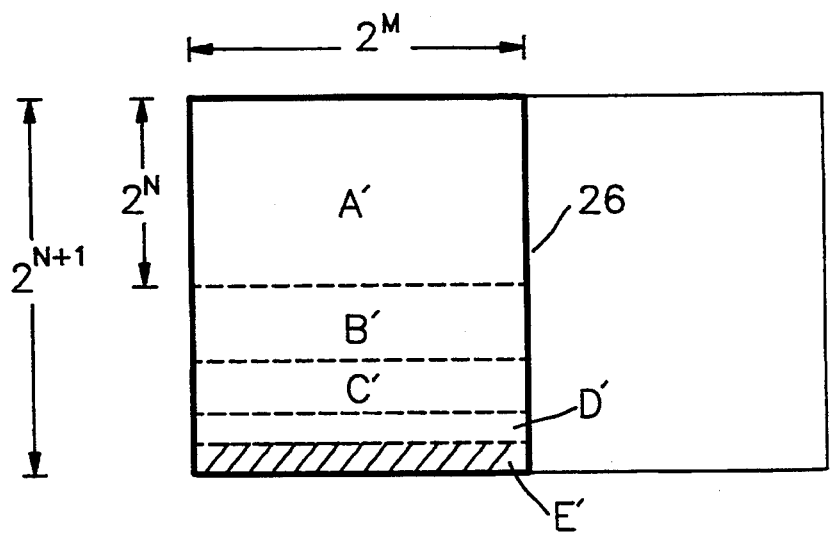

FIGS. 2A and 2B two-dimensionally describe the mapping technique as mentioned above. In FIG. 2A, there are two rectangular boxes 22 and 24. The larger one represents $2^{M+1} \times 2^{N+1}$ of a memory. And the other denotes $(2^M+X) \times (2^N+Y)$ of pixels from a frame signal stored therein. As shown in FIG. 2A, the four regions A, B, C and D corresponding to the four terms in Eq(1) are arranged. That is, region A is compartmentalized for the first term $2^{M+N}$; region B is segmented for the second term $2^M Y$; region C is given for the third term $X 2^N$; and region D represents the last term XY.

Similarly, in FIG. 2B, there is given a rectangular box having five regions A', B', C', D' and E', representing $2^M \times 2^{N+1}$ of a memory or the storage locations for a frame signal after the address mapping. As shown in FIG. 2B, the four regions A', B', C' and D' are regionalized for the four terms in Eq(2), i.e., $2^{M+N}$, $2^{M+N-1}$, $2^{M+N-2}$ and $2^{M+N-3}$. The region E' is the remaining storage after the address mapping.

The present invention performs the address mapping with respected to the four regions. That is, the virtual address regions A, B, C and D in FIG. 2A are mapped to the physical address regions A', B', C' and D' in FIG. 2B. As a result of the address mapping, the size of the memory is optimized to that of the actual or physical frame signal.

In accordance with the invention, identification of the four virtual address regions A, B, C and D (shown in FIG. 2A) is accomplished through the use of the most significant bit (MSB) among the horizontal address bits and that among the vertical address bits constituting a virtual address. If the MSB of the horizontal address component is 0 and the MSB of the vertical address component is 0, region A is identified. If the MSB of the horizontal address component is 0 and the MSB of the vertical address component is 1, region B is identified. If the MSB of the horizontal address components is 1 and the MSB of the vertical address component is 0, region C is identified. And if the MSB of the horizontal address component is 1 and the MSB of the vertical address component is 1, region D is identified. Similar identification is carried out with respect to the physical address regions A', B', C' and D'. Accordingly, it becomes possible to perform address mapping from the virtual address domain to the physical address domain on a region-by-region basis.

Figure 3A:
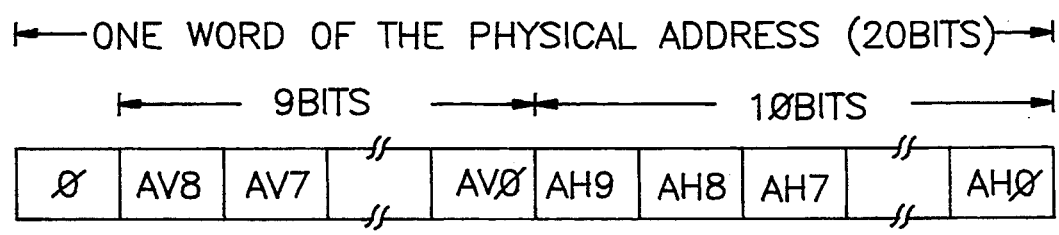
FIGS. 3A-3D depict the structure of one word of the physical address.
Figure 3B:
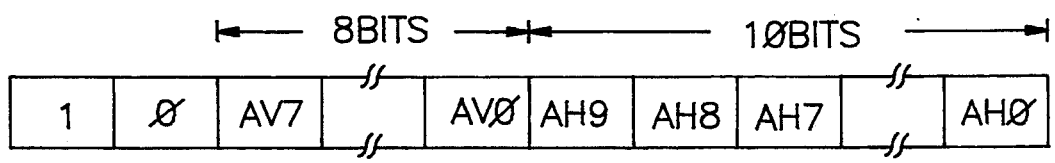
Figure 3C:
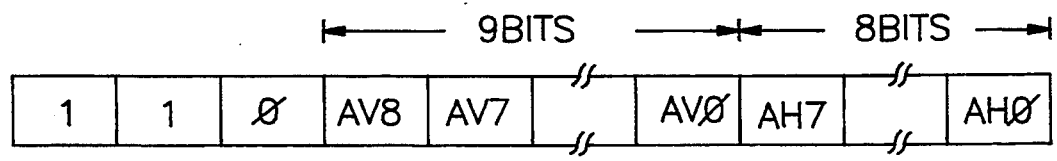
Figure 3D:
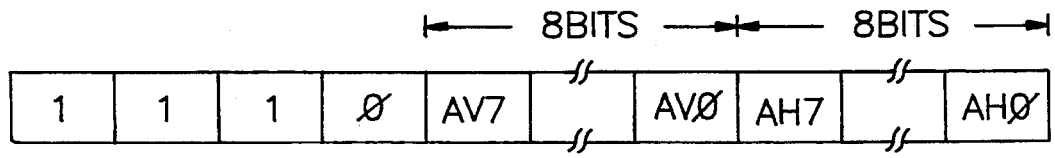

FIGS. 3A to 3D describe the structure of one physical address word directly provided to the memory 30. Since the size of the physical address memory 30 is $2^{20}$, a physical address word consists of 20 bits. In the preferred embodiment, the physical address word is structured in four forms corresponding to the four regions A', B', C' and D' (as shown in FIG. 2B). These four forms are described in FIGS. 3A-3D. As shown in FIG. 3A, the most significant bit(MSB) is 0, which represents region A'. And, the lower address 19 bits, except the MSB, are provided to address one of the storage locations in said region A'. Similarly, as shown in FIG. 3B, the MSB and one adjacent bit are 1 and 0, respectively, which represent region B'. And, the lower address 18 bits are provided to address one of the storage locations in said region B'. Further, as shown in FIG. 3C, the MSB and two adjacent bits are 1, 1 and 0, respectively, which represent region C'. And, the lower address 17 bits are provided to address one of the storage locations in said region C'. Lastly, as shown in FIG. 3D, the MSB and three adjacent bits are 1, 1, 1 and 0, respectively, which represent region D'. And the lower address 16 bits are provided to address one of the storage locations in said region D'.

FIG.4 is a detailed circuit diagram of the address mapping circuitry in the memory system. As shown in FIG. 4, the address mapping circuitry 20 includes a time delay block 40, and twelve multiplexers to perform the address mapping from the virtual address domain AH[10 . . . 0] and AV[9 . . . 0] to the physical address domain A[19 . . . 0]. Since, in the four forms of the physical address(shown in FIGS. 3A-3D), lower physical address bits A[7 . . . 0] in one word have the same virtual address bits, i.e., AH[7 . . . 0], the lower physical address bits A[7.0] are obtained by using said AH[7 . . . 0] just as they are. Since, however, the upper physical address bits in a physical address word, i.e., A[19 . . . 8], are different, it is required to manipulate an address change.

For the purpose of effectuating the address change, the twelve multiplexers are provided. Each multiplexer has four address input ports IN0,IN1,IN2 and IN3 and two selection signal input ports S0 and S1. Although not indicated, one output port is made to provide selected address data to the memory 30. The virtual address, provided to the IN0,IN1,IN2 and IN3, is of the same address form as shown in FIGS. 3A to 3D. That is, the 9th address bits provided to the four input ports IN0,IN1,IN2 and IN3 of the first multiplexer 42 are AH8(from FIG. 3A), AH8(from FIG. 3B), AV0(from FIG. 3C) and AV0(from FIG. 3D). Further, the 10th address bits provided to the four input ports IN0,IN1,IN2 and IN3 of the second multiplexer 44 are AH9(from FIG. 3A), AH9(from FIG. 3B), AV1 (not shown in FIG. 3C) and AVl(not shown in FIG. 3D). Lastly, the address bits provided to the four input ports IN0, IN1,IN2 and IN3 of the 12th multiplexer 46 are 0,1,1 and 1, as respectively shown in FIGS. 3A to 3D. In the meantime, the time delay block 40 is used to match the input timing of the address bits A[7 . . . 0] to that of the address bits A[19 . . . 8].

The selection signals provided to the selection signal input ports, S1 and S0, are, respectively, the MSB of the horizontal address component, e.g., AH10 and the MSB of the vertical address component, e.g., AV9. When AH10 and AV9 are 0 and 0, respectively, the address bits provided to the IN0's are selected to generate a physical address in the first region, i.e., region A', of the physical address domain. Also, when AH10 and AV9 are 0 and 1, respectively, the address bits provided to the IN1's are selected to produce a physical address in the second region, i.e., region B'. Further, when AH10 and AV9 are 1 and 0, respectively, the address bits provided to the IN2's are selected to construct a physical address in the third region, i.e., region C'. In addition, when AH10 and AV9 are 1 and 1, respectively, the addresses provided to the IN3's are selected to output a physical address in the last region, i.e., region D'.

While the present invention has been described with respect to the particular embodiments, it will be apparent to those skilled in the art that various changes and modifications may be made without departing from the spirit and scope of the invention as defined in the following claims.

What is claimed is:

1. A memory system for storing a two dimensional digitized image signal consisting of a plurality of pixels arranged in $(2^M+X)$ columns and $(2^N+Y)$ rows, wherein X and Y do not exceed $2^{M-2}$ and $2^{N-1}$, respectively, and M and N are positive integers, comprising:

means for generating (M+N+2) bits of a virtual address having (M+1) bits of a horizontal address component representing said $(2^M+X)$ columns and (N+1) bits of a vertical address component representing said $(2^N+Y)$ rows;

memory means, having storage locations of $2^{M+N+1}$, for storing the two dimensional digitized image signal, each of the storage locations capable of storing one pixel data therein and addressable by (M+N+1 bits) of a physical address; and mapping means for changing the virtual address to the physical address, wherein said mapping means utilizes a most significant bit of the horizontal address component and that of the vertical address component constituting the virtual address to regionalize the storage locations of said memory means into four regions so as to map the virtual address to the physical address on a region-by-region basis.

2. The system in accordance with claim 1, wherein the four regions are comprised of a first region having $2^{M+N}$ storage locations, a second region having $2^{M+N-1}$ storage locations, a third region having $2^{M+N-2}$ storage locations, and a fourth region having $2^{M+N-3}$ storage locations.

3. The system in accordance with claim 2, wherein the first region is addressed by a most significant bit of a physical address, the second region is addressed by a most significant bit and its one adjacent bit of a physical address, the third region is addressed by a most significant bit and its two adjacent bits of a physical address and the fourth region is addressed by a most significant bit and its three adjacent bits of a physical address.

* * * * *